United States Patent [19]

Maresch et al.

[11] Patent Number: 5,047,616
[45] Date of Patent: Sep. 10, 1991

[54] READING DEVICE FOR READING NON-STATIONARY DATA STORAGE MEANS

[76] Inventors: Klaus Maresch, Bahnstrasse 34, 8035 Stockdorf; Michael Maresch, Schellingstrasse 93, D-8000 Munchen 2, both of Fed. Rep. of Germany

[21] Appl. No.: 435,426

[22] PCT Filed: Feb. 13, 1989

[86] PCT No.: PCT/EP89/00131
§ 371 Date: Nov. 15, 1989
§ 102(e) Date: Nov. 15, 1989

[87] PCT Pub. No.: WO89/07802
PCT Pub. Date: Aug. 24, 1989

[30] Foreign Application Priority Data

Feb. 12, 1988 [DE] Fed. Rep. of Germany ....... 3804340

[51] Int. Cl.$^5$ .............................................. G06K 7/06
[52] U.S. Cl. .................................. 235/435; 235/454; 235/457
[58] Field of Search ............... 235/435, 379, 454, 482, 235/457; 371/27; 902/3

[56] References Cited

U.S. PATENT DOCUMENTS 3,906,448 9/1975 Henriques ........................ 235/454
4,260,880 4/1981 Thomas ............................. 235/454
4,514,623 4/1985 Baus et al. ........................ 235/482

FOREIGN PATENT DOCUMENTS 0083742 7/1983 European Pat. Off. .
2599530 12/1987 France .
2080004 1/1982 United Kingdom .

Primary Examiner—Harold Pitts
Attorney, Agent, or Firm—Lowe, Price, LeBlanc & Becker

[57] ABSTRACT

A reading device having a reading head for automatically reading an external non-stationary data storage arrangement, for example, a credit card, may be supervised continuously with respect to its readiness for service. When no external data storage arrangement is inserted, a stationary test data storage arrangement is read by the reading head. The stationary test data storage arrangement is the same or similar to the non-stationary data storage arrangement and can be read identically by the reading head. If the test data read by the reading head from the test data storage arrangement are not transmitted to a processing unit at an expected time, a defect signal is set.

8 Claims, 2 Drawing Sheets

READING DEVICE FOR READING NON-STATIONARY DATA STORAGE MEANS

BACKGROUND OF THE INVENTION

The present invention relates to a reading device for reading data from virtually any non-stationary data storage means. The expression "non-stationary data storage means" in the meaning of the present invention, has to be understood in broadest sense, and may be, for example, a paper, plastic or metal sheet or virtually any other sheet material, preferably a stiff sheet material, which contains information in the form of readable characters, surface denticulations, recesses, special reflection areas or other marks, wherein these characters or marks may be detected or read optically, electrically, magnetically, capacitively or in virtually any other way. Furthermore, the non-stationary data storage means may be, for example, a magnetic, optical, magneto-optical or electro-optical storage chip which is integrated in or attached to a support for ease of handling, and which can be read either galvanically or in a non-contact way. Furthermore, the non-stationary data storage means may be a three-dimensional body serving the same purpose, for example, the shape of a rod, in particular the shape and the size of an ordinary pencil, a cuboid or a sphere.

The non-stationary data storage means can also be a credit card, an identification card or any other authorisation card containing clearly readable and/or hidden data, a savings bank deposit book comprising impressed data, or a key-type object.

Normally, to read the stored data, the non-stationary data storage means is inserted into a reading device from outside through a specially designed opening corresponding to the cross-sectional profile of the non-stationary data storage means. Thereby, the non-stationary data storage means enters into a reading area of a reading head which is compatible to read data from the non-stationary data storage means.

The reading head may be, for example, an optical image sensor, an optical, mechanical, magnetic, capacitive or electrical detector or simply a galvanic multipole connector.

The data read from the non-stationary data storage means may be converted, manipulated and/or processed in the reading device and transmitted either afterwards or immediately as read by means of a corresponding transmission line to a processing unit, preferably a computer.

Thus, reading devices in the meaning of the invention may be for example and preferably reading devices for credit cards and savings bank deposit books in automatic teller machines, reading devices for vouchers in automatic accounting devices, reading devices for identification cards in systems testing the authorisation of admittance or mechanical detectors in controlling systems, in particular in locking systems.

Consequently, reading devices in a more narrow meaning of the present invention especially are those reading devices as defined above, which are at least substantially unrestrictedly public and which are used as data input devices for at least normally unsupervised automatic devices, which are for example devices reading credit cards, savings bank deposit books or identification cards.

Those reading devices are normally the only interface between the user and the processing unit.

If the reading device and/or the transmission line is mechanically, electrically, optically or in any other way put out of operation wilfully or by any other defect, normally, the processing unit will assume that the reading device is not in use. By that systematic interpretation mistake, the operator of a system comprising such failed reading devices can suffer damage, which may be, depending upon the type of use, considerable and which possibly may not be compensated.

To avoid these disadvantages, it is one object of the present invention, to provide a reading device as described above, which indicates reliably and in a fail-safe manner any disturbance in readiness for service of the reading device and/or of the transmission line to the processing unit.

It is another object of the present invention to provide a method which enables reliable and fail-safe detection of a disturbance in the readiness for service of automatic reading devices for vouchers or reading devices for non-stationary data storage means, wherein a failure of the data transmission line between the reading device and a processing unit can also be detected.

SUMMARY OF THE INVENTION

Thus, it is the basic idea of the present invention to supervise continuously and under realtime conditions data input devices, especially data input devices which are in danger of being damaged, in particular data input devices which are substantially unrestrictedly public, as well as their data transmission line to the processing unit with respect to their error-free and failure-free operational reliability. The supervising or monitoring occurs in that the data input device, here the reading device, is not put out of operation to a stand-by state when it is not used, but that the data input device is operated such that, in the interim periods between actual use, it reads and transmits test data from a test data storage medium either continuously or intermittently in predetermined intervals, wherein the test data storage means can be read in an identical way as the non-stationary data storage means to be read and wherein the test data storage means is read identically by the same reading head. Afterwards, the red test data are transmitted to a processing unit identically like the operational data, by which fact, additionally, the supervising of the operational conditions of the transmission line is enabled, independently, whether this transmission line is within the data input or reading device or whether it is a data telecommunication line.

BRIEF DESCRIPTION OF THE DRAWINGS

In the following, the invention is described more in detail with special embodiments of the present invention together with the accompanying drawings. The figures depict FIG. 1 a credit card reading device in perspective view as seen from below.

DESCRIPTION OF THE PREFERRED EMBODIMENT

Figure 1:
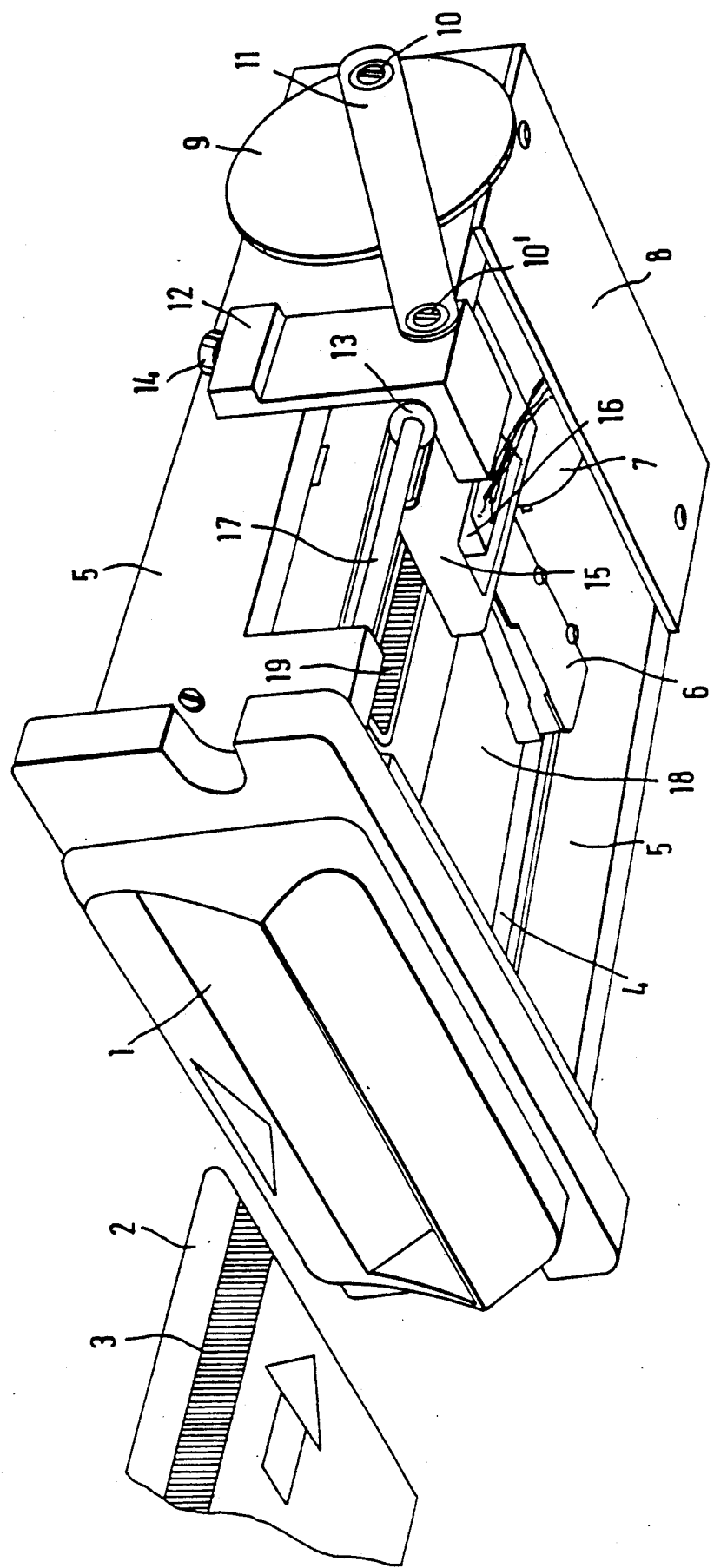

FIG. 1 depicts schematically in perspective view, obliquely from below, a device for reading credit cards 2 comprising a magnetic recording track 3. The card is inserted into the reading device through an insert opening 1 provided in a front plate facing outwards, wherein the recording track 3 faces downwards. Inside the housing of the device, the card 2 is guided upon and between guiding elements 4 attached to the sidewalls 5 of the housing such that the card, when inserted, is brought into the reading area of a magnetic reading head 16, which is attached to a reading head support 15.

The insert path of the card to be read is limited by a micro-switch 6 serving on the one hand as end-stop means and, on the other hand, at the same time for switching a motor 7, when the inserted card touches the end-stop means, wherein that motor 7 controlled by a control unit 8 turns around a gear wheel 9 for one rotation of 360°. By that, a connecting rod 11 pivoted to a crank pin 10 of the gear wheel 9 moves an angle slider 12 translationally once back and forth, which angle slider 12 guided by means of a bearing bush 13 along a rail 17. Below, the angle slider carries the reading head support 15. Additionally, the angle slider 12 is supported by a second bearing element which is formed as a contact pressure roller bearing 14 supported by the outer surface of the side wall 5 of the housing of the device.

In this arrangement, the position of the reading head 16 and the moving path of the reading head are adapted to each other such that the magnetic recording track 3 of an inserted card 2 can be read.

When the reading device is in its non-operating position, as illustrated in FIG. 1, wherein a card functioning as a non-stationary data storage means to be read is not inserted into the reading area 1,4 of the device, a magnetic recording track serving as a stationary test data storage means 19 is inside the reading area of the magnetic reading head 16.

As long as no credit card is inserted into the reading device as illustrated in FIG. 1, the micro-switch 6 remains open. When the micro-switch 6 is open, the control unit 8 for driving the reading head 16 is controlled by a timer. This timer, which is not shown in the drawings, can be an external mechanical or electro-mechanical or electronic pulse generator as well as an integrated part of the control unit 8. In the same way, the control unit 8 can be a mere mechanical, an electro-mechanical or an electronic control unit. Once again, not the definite realisation of the function is essential for the present invention but the relative combination of all device elements with respect to each other such that, when the micro-switch 6 is open, the control unit 8 is controlled by a timer which can be adjusted according to the special application and to the special requirements by the user, so that it provides switching pulses to the control unit 8 and by means of the control unit to the motor 7. Thereby, when no card is inserted, the reading head 16 is moved over the magnetic recording track 19 serving as a stationary test data storage means in the same way as over the magnetic recording track 3 of an inserted card. The test data are read by the reading head 16 and are either processed by the reading device or transmitted by a transmission line not illustrated in the figures to an external processing unit.

As long as the processing unit receives correctly in time the test data read by the reading device from the stationary test data storage means, it is guaranteed that the reading device for credit cards as shown in FIG. 1 is operated precisely, that the data read by the reading head 16 are transmitted precisely to the processing unit and that also a credit card inserted by an external user can be read error-free.

When the reading device for credit cards or the transmission line between the reading head 16 and the processing unit fails partially or totally, the data which should be read exactly from the test data storage means 19 cannot reach the processing unit or are not completely identical to the expected data by which fact the processing unit can detect the malfunction of the reading device for credit cards. In response to that function, for example, a warning signal or a defect signal can be set by the processing unit, which signal informs the operator of the system of the necessity to reestablish the readiness for service of the reading device being out of order.

Additionally, as can be seen easily by a person skilled in the art, a qualitative mistake diagnosis is enabled. When, for example, a credit card is not inserted completely into the reading area, so that the micro-switch 6 is not closed, the reading head 16 is not moved under the control of the credit card but under the control of the timer of the device. This has the effect that neither the information of the magnetic track 3 of the credit card 2 nor the test data of the stationary test data storage means 19 are completely and precisely read and transmitted to the processing unit. By the fact that the data of the credit card as well as the test data so far as they are read can be recognized as read precisely, the processing unit can recognize without any problems the reason for the detected malfunction, which is here the credit card not being inserted up to the end stop means. The processing unit can be programmed without any problems so that, having recognized that mistake, it will set the defect signal only when that operational mistake lasts longer than a predetermined time limit of, for example, about 10 or 15 minutes.

In the embodiment of a credit card reading device shown in FIG. 1, the credit card 2 serving as a non-stationary data storage means and the test data storage means 19 are statically fixed during the reading operation while the reading head 16 is moved over the magnetic tracks 3,19. As can be seen easily by a person skilled in the art, these relationships can be inverted such that the credit card is pulled automatically into the reading area and pushed out again by a suitable driving mechanism, for example a friction wheel mechanism, whereat the credit card is moved across the stationary reading head 16. In this embodiment of the device, the test data storage means 19 also movable, which means it is arranged on a movable carrier so that it is moved over the stationary reading head 16 in the same way like an inserted credit card by the same friction wheel driving mechanism pulling the credit card into the housing. The replacement of the non-stationary data storage means, i.e. the credit card, by the stationary test data storage means and vice versa may take place in principally any way, for example such that the carrier of the test data is moved back by means of a stop means arranged movably in the insert path of the credit card against the force of a back spring. It is essential that the test data storage means is brought into the reading area of the reading head as long as no non-stationary external data storage means, which is here a credit card, is inserted into the insert slit of the reading device and that the reading head is reading necessarily and completely the credit card instead of the test data storage means when such a card is inserted.

Figure 2:
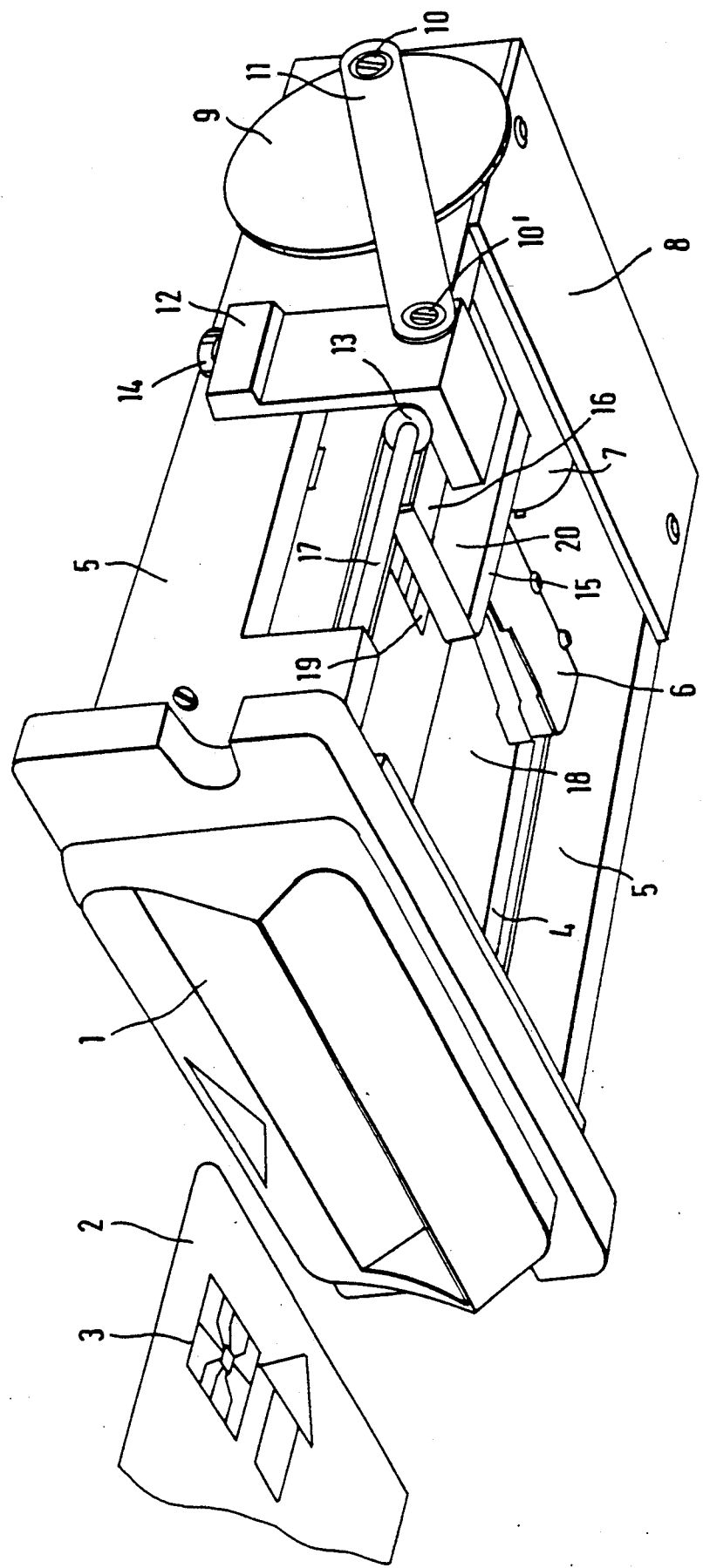
FIG. 2 a reading device for identification cards comprising an integrated storage chip.

A further embodiment of the invention is shown in FIG. 2, also illustrated schematically in a perspective view obliquely from below. The reading device shown in FIG. 2 is a reading device for identity cards 2, comprising an integrated semi-conductor storage means 3 in the function of a non-stationary data storage means containing a comparably large mass of data. An identical storage chip serves as a test data storage means 19, which is fixed statically and stationary above the reading head 16 in the reading device.

The reading head 16 is provided in the form of a group of springy contacts arranged complementary with respect to the connection contact surface areas of the data storage chips 3,19. The reading head 16 is attached to a reading head support 15 which pivots with respect to an axis extending transverse to the guiding means 4. At its lower side, the pivoted reading head support 15 is provided with a bearing surface 20 in contact with the angle slider 12. In this embodiment, the angle slider 12 is of the same kind and can be moved in the same way as illustrated with respect to the embodiment shown in FIG. 1. In FIGS. 1 and 2, the same parts are characterized by the same reference numbers.

The bearing surface 20 of the reading head support 15 and the corresponding bearing surface at the inner side of the angle slider 12 are wedge-shaped with respect to the guiding rod 17 of the angle slider 12 such that the pivoted reading head support 15 and the springy contact reading head 16 connected rigidly therewith are moved upwards, as can be seen in FIG. 2, when the angle slider 12 is moved by the motor in the direction of the insert opening 1 of the reading device. This means that the springy contact reading head 16 is pressed to the contact surfaces of the respective offered data storage means 3 or test data storage means 19. Normally, not even the rotation of the gear wheel 9 has to be interrupted for enabling the reading operation, because, on the one hand, the reading of the data from the storage chip is carried out extraordinarily fast and, on the other hand, the maximum contact pressure of the contacts is provided practically at the slack point of the crank mechanism 9,10,11.

With respect to other features, the reading device for identity cards illustrated in FIG. 2 corresponds to the embodiment shown in FIG. 1 explained in detail so that the above explanations are referred to.

As can be easily seen by a person skilled in the art when regarding FIG. 2, the test data storage means 19 does not necessarily comprise the same physical construction as the external non-stationary data storage means 3. It is essential that the test data storage means reproduces at least that physical construction so that, when the identification card 2 is not inserted, the reading head 16 discovers the same combination and arrangement of contact surfaces at the test storage means as an inserted identification card. Consequently, in this embodiment, the test storage means can be, for example, a micro-computer which can be positioned in the reading device at another location offering from there the test data to be read by the reading head 16 at the contact surfaces of the test data storage means by means of respective electric connections.

Correspondingly, the same goes for example for the credit card reading device illustrated in FIG. 1. It could be possible in this embodiment, too, that the test data storage means 19 has not to be necessarily with respect to its physical construction made from the same magnetizable coating material used for the magnetic track 3 of the credit card 2 (FIG. 1). It could be, for example, that the test data storage means 19 is a predetermined series of electro-magnetically generated magnetic micro fields which can be read by the magnetic reading head 16 in the same way like the data read from the magnetic recording track 3. Primarily, the identical readability is essential and not the identical physical construction of the test data storage means.

The abstract added to the description is part of the original disclosure of the present invention.

We claim:

1. A reading device for reading data automatically from a non-stationary data storage means (2,3), comprising a reading head (16) having a reading area inside the reading device, guide means for enabling insertion of the non-stationary data storage means into the reading area from outside the reading device along a guide path to enable reading of data from the storage means with the reading head, and further including stationary test data storage means (19), fixedly and immovably mounted inside the reading device and wherein said test data storage means is of a type corresponding to the non-stationary data storage means (2,3) and wherein said test data storage means is constantly present within the reading area of the reading head (16) for reading test data during the absence of non-stationary data storage means inserted into the reading area.

2. A reading device according to claim 1, wherein the guide means (4) for the non-stationary data storage means (2,3) is arranged between the test data storage means and the reading head such that the inserted non-stationary data storage means covers the test data storage means, without moving the test data storage means, to thereby prevent access to the test data storage means by the reading head.

3. A reading device according to claim 2, wherein the reading head can be moved relative to the non-stationary data storage means and the test data storage means for reading data, and wherein the storage medium of each data storage means (2,3;19) is a magnetizable coating and the reading head is a magnetic reading head which can be positioned for reading data alternatively on at least one recording track of the non-stationary data storage means as well as on at least one recording track of the test data storage means.

4. A reading device according to claim 1, wherein each of the non-stationary data storage means, the test data storage means and the reading head are immovably fixed during data reading, and wherein the storage medium of each data storage means (2,3;19) is a semi-conductor chip (3) integrated into a support card (2) and that the reading head (16a) is a contact plate which can be resiliently pressed to non-covered contact areas of the chips (3;19).

5. A reading device according to claim 2, wherein the reading head can be moved relative to the non-stationary data storage means and the test data storage means for reading data, and wherein the storage medium of each data storage means (2,3;19) is an optically readable variation of the surface of the data storage supports, which variation may be within the visible or the invisible spectral range, and that the reading head is either an optical image sensor or an optical detector.

6. A reading device according to claim 5, wherein the non-stationary data storage means is a savings back deposit book the storage medium is an imprint or a hand-written entry and the reading head is an ordinary OCR-reading-head.

7. A method for supervising and automatically determining operability of (1) data input devices having reading heads for reading data from inserted non-stationary data storage means inserted therein, and of (2) data transmission lines connecting said devices to an external processing unit, comprising the steps of reading, when no external non-stationary data storage means is inserted into the input device, a test data storage means fixedly and immovably mounted inside the device using a same method by which the non-stationary data storage means is read by the reading head upon insertion of the non-stationary data storage means into the device; transmitting the read test data by the transmission lines to the processing unit testing the correctness of said data and setting a defect signal if the test data are incorrect or missing.

8. The method according to claim 7, wherein the input devices are automatic teller machines or devices testing the authorization of admittance.

* * * * *